UNITED STATES PATENT OFFICE.

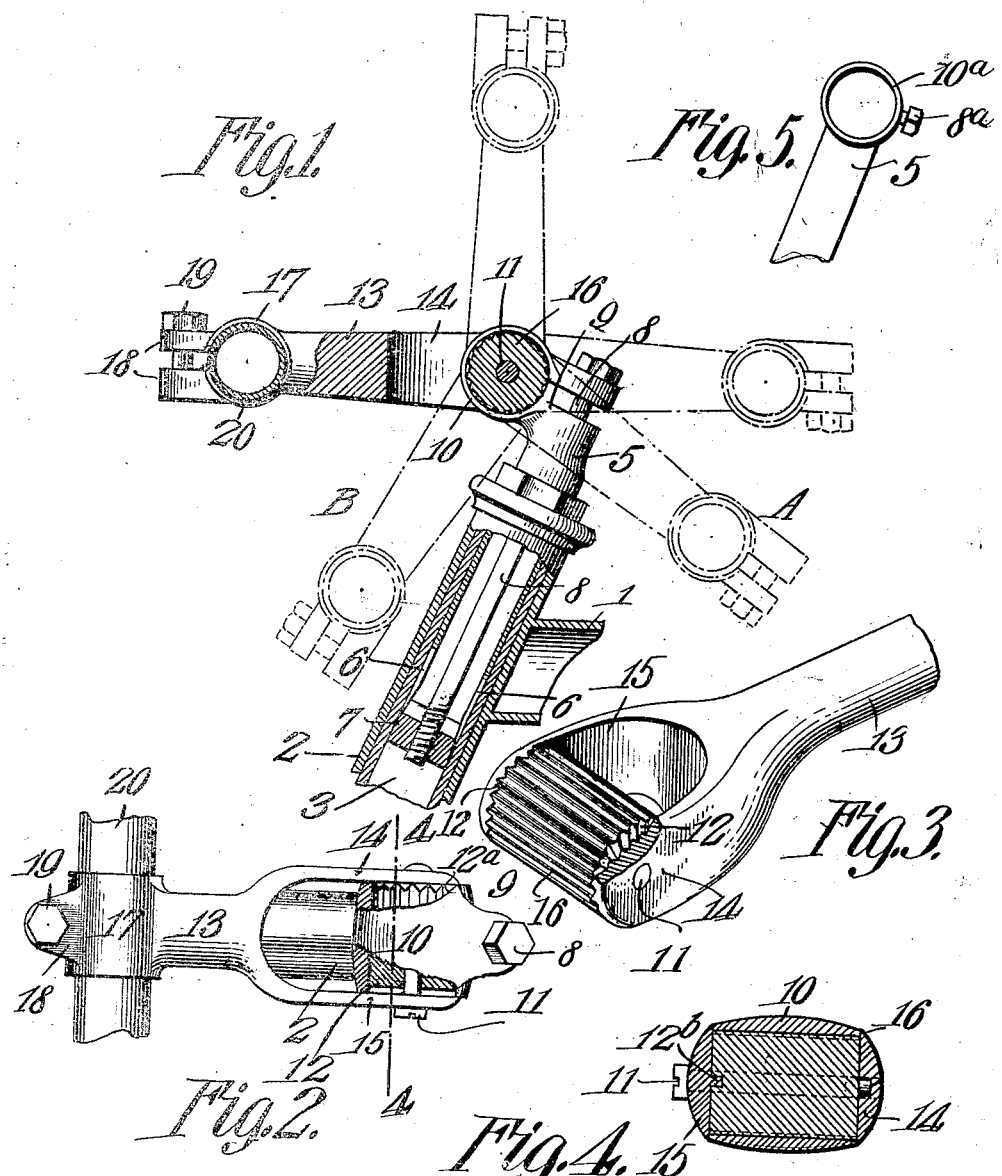

SAMUEL E. PURDUM, OF MACOMB, ILLINOIS.

ADJUSTABLE HANDLE-BAR BRACKET.

No. 921,457.  Specification of Letters Patent.  Patented May 11, 1909.

Application filed September 28, 1908. Serial No. 454,977.

*To all whom it may concern:*

Be it known that I, SAMUEL E. PURDUM, a citizen of the United States, residing at Macomb, in the county of McDonough and State of Illinois, have invented a new and useful Adjustable Handle-Bar Bracket, of which the following is a specification.

This invention relates to adjustable handle bar brackets for bicycles; and has for its object to provide a bracket for supporting a handle bar pivoted on the head of a bicycle on the usual handle bar post and adapted to swing in a plane passing longitudinally through the bicycle frame and be fixed securely to said post in any position desired. The bracket adjustably carries in a clamp on its outer end a handle bar capable of being set in any desired position around the axis of said clamp.

With this and other objects in view the invention consists of the novel construction, combination and arrangement of parts hereinafter described and claimed, and illustrated in the accompanying drawing, in which:

Figure 1 is a vertical longitudinal section through a portion of the head of a bicycle, the adjustable bracket and the handle bar; Fig. 2 a top plan view of the same partly in section; Fig. 3 a perspective view of the forked end of the bracket; Fig. 4 a section on the line 4—4 of Fig. 2; and Fig. 5 a view of a modification.

Like reference characters are used for the same parts in all the figures.

The preferred form of construction is shown in Figs. 1 to 4 of the drawings wherein 1 indicates a portion of the tubular frame or top of a bicycle, brazed to an inclined tube 2 that forms the bicycle head of well known construction. Within the head 2 is a steering post 3. Arranged within the steering post is a post 5, having longitudinal slots 6. The lower portion of the inner wall of the post 5 is tapered to receive a tapered nut 7 which when drawn upwardly by a bolt 8, causes the slotted end of the post to spread and bear against the steering post 3, so that the post can neither be withdrawn nor rotated. The upper end of the handle bar post 5 projects above the bicycle head 2 and is finished with a ring clamp 9 of well known type having a forwardly projecting circular loop 10. Any other form of post 5 may be used instead of the one described, such for instance as that represented in Fig. 5 wherein the post is provided on its upper end with a loop or socket $10^a$ perpendicular to the post and in which socket the handle bar bracket may swing and be fastened in position by an ordinary bolt $8^a$ passing through the side of the socket. When the post shown in Fig. 5 is employed it may be fastened in place in any suitable manner or it may form a part of the steering post proper, the construction shown being one that is well known in bicycles.

The numeral 13 indicates the handle bar bracket which is forked at its rear end to form two arms 14 and 15, separated from each other a distance equal to the length of the ring clamp 9. Between the ends of these arms is fastened a cylindrical block mounted to turn in the ring clamp 10 or socket $10^a$ when the bolt 8 or $8^a$ respectively is loosened, but remains fixed when either of said bolts is tightened. The outer end of the handle bar bracket is formed into a ring clamp 17 provided with lugs 18 and a screw bolt 19 for drawing the clamp together on a handle bar 20 of any approved shape.

The cylindrical block 16, heretofore mentioned, is preferably made of a separate piece although it may be cast integral with the bracket. When made separately it is fastened between the arms 14 and 15 by an axial bolt or screw 11 passing through the several parts. The block 16 is prevented from turning on the screw or bolt 11 by means of a series of radial lugs 12, and notches $12^a$ formed on the inner faces of the arms 14 and 15 interlocking with similar notches and lugs $12^b$ on the adjacent ends of the cylindrical block 16, as clearly indicated in Figs. 2 and 3, or a single lug 12 on each arm fitting one or more notches in each end of the bearing may be substituted. If desired, pins and holes may be substituted for the lugs and notches, or the lugs may be transposed and placed on the bearing instead of the arms. These lugs and notches are necessary to prevent the bracket being raised or lowered independently of the bearing by pulling or pressing down on the handle bars while riding. The frictional contact between the ends of the block and the sides of the arms is not sufficient to hold these parts in contact when a strain is placed on the handle bars. As a further precaution against raising the bracket 13, the exterior surface of the cylindrical block 16 is provided with longitudinal ribs formed by grooving the block from end to end, which ribs tend to bite into the ring clamp 9 when the latter is tightened by the bolt 8. If the screw bolt 8 be loosened the post 5 may be raised or lowered to any height desired. At the same time the handle bar bracket 13 can be turned on its axis to any of the dotted line positions indicated, or to any position between the lowermost inner position A and the lowermost outer position B by rotating the bracket upwardly. A further adjustment of the handle bar 20 is provided for by fastening it in the ring clamp 17.

It will be seen that the device forming the subject of the present invention is in the form of an attachment that may be applied to any ordinary bicycle it being merely necessary to remove the handle bar 20 from the ring clamp 10 where it is placed in the ordinary bicycle; to insert the cylindrical block 16 and attach the extension bracket 13, after which the handle bar may be placed in the clamp 17 of the latter. The bracket 13 may be adjusted with the axis of the bolt 11 as a center of movement by merely loosening said bolt or when the bolt 8 is loosened for the purpose of raising or lowering the post 5 the bracket 13 may be adjusted without the necessity of loosening the bolt 11 and this adjustment will save time as it is usually necessary or desirable to change the adjustment of the handle bar whenever the post 5 is raised or lowered.

Every adjustment desired by a bicycle rider is made possible by the construction hereinabove described which is simple, strong and free of intricate parts. A wrench is the only tool necessary to make every change of position desired and these changes can be made with rapidity.

What is claimed is:—

1. As a new article of manufacture, a handle bar supporting bracket provided at its forward end with a handle bar clamp, the rear end of the bracket being bifurcated to form a pair of arms, and a cylindrical block mounted between said arms, a bolt extending axially through the block and through the openings in the arms, the adjacent ends of the arms and the inner face of the block being provided with interengaging members to lock them in relative adjusted positions and the periphery of the block being ribbed.

2. In a device of the class described, a steering post head having a clamping sleeve, a cylindrical block arranged therein and having a ribbed periphery for engagement with the inner surface of the sleeve, a bracket bifurcated at its rear end to form a pair of arms that straddle the sleeve and block, the opposite ends of the block and the inner faces of the arms being provided with engaging members, a locking bolt extending through the arms and axially through the block to lock the parts in adjusted position, and a handle bar carrying clamp disposed at the outer ends of said bracket.

In testimony that I claim the foregoing as my own, I have hereto affixed my signature in the presence of two witnesses.

SAMUEL E. PURDUM.

Witnesses:
 GEORGE M. WELLS,
 J. O. PEASLEY.